United States Patent [19]
Yu

[11] Patent Number: 6,072,386
[45] Date of Patent: Jun. 6, 2000

[54] BICYCLE SPOKE WARNING LIGHT DEVICE CAPABLE OF SETTING AND DISPLAYING CHARACTERS

[76] Inventor: Yung-Jung Yu, No. 20, Lane 221, Sec. 4, Chung-Ho Street, Hsing She Hsiang, Taichung Hsien, Taiwan

[21] Appl. No.: 09/305,370

[22] Filed: May 5, 1999

[51] Int. Cl.[7] .................................................. B62J 6/00
[52] U.S. Cl. .................. 340/432; 340/815.45; 362/276; 362/800
[58] Field of Search ................................ 340/432, 463, 340/815.45; 362/800, 802, 276

[56] References Cited

U.S. PATENT DOCUMENTS

| | | | |
|---|---|---|---|
| 4,290,047 | 9/1981 | Latta, Jr. .................................. | 340/435 |
| 5,667,290 | 9/1997 | Cioletti et al. ............................ | 362/72 |
| 5,800,039 | 9/1998 | Lee ............................................ | 362/72 |
| 5,903,224 | 5/1999 | Reynolds ............................ | 340/815.45 |

*Primary Examiner*—Daniel J. Wu
*Assistant Examiner*—Sihong Huang
*Attorney, Agent, or Firm*—Rosenberg, Klein & Lee

[57] ABSTRACT

A bicycle spoke warning light device capable of setting and displaying characters. The device is mounted on the spoke of the bicycle, in which a rotational speed detecting unit of a controlling circuit detects the rotational speed of the spoke. When the rotational speed reaches a certain value, a processor takes out the data set in a memory unit by a setting unit and makes multiple light sources immediately emit light to form a predetermined picture or character on the quickly rotating spoke by using temporarily remaining vision so as to achieve a highlighting and warning effect.

4 Claims, 7 Drawing Sheets

BICYCLE SPOKE WARNING LIGHT DEVICE CAPABLE OF SETTING AND DISPLAYING CHARACTERS

BACKGROUND OF THE INVENTION

The present invention relates to a bicycle spoke warning light device capable of setting and displaying characters, and more particularly to a warning light device mounted on the spoke of the bicycle, in which a controlling circuit detects the rotational speed of the spoke and makes multiple light sources immediately emit light to form a predetermined picture or character on the spoke by means of persistence of vision.

In spite of various kinds of mobile vehicles which are widely used all over the world, bicycles still serve as important healthy leisure tools. Therefore, it is necessary to ensure the safety in riding a bicycle.

Generally, a reflecting attachable paper or sticker is attached to the body of the bicycle, whereby when a light is projected onto the bicycle, the light is reflected from the bicycle to achieve a warning effect for ensuring safety. However, in the case that there is no light or the illumination is insufficient, it will be impossible to reflect the light so that no warning effect can be achieved. As a result, danger may take place in riding the bicycle. Alternatively, a light can be installed on front side of rear side of the bicycle as a warning device. However, such light cannot highlight the bicycle and can only provide a poor warning effect.

SUMMARY OF THE INVENTION

It is therefore a primary object of the present invention to provide a bicycle spoke warning light device capable of setting and displaying characters. The device is mounted on the spoke of the bicycle, in which a rotational speed detecting unit of a light emitting device detects the rotational speed of the spoke. When the rotational speed reaches a certain value, a processor takes out the data set in a memory unit by a setting unit and makes multiple light sources immediately emit light to form a predetermined picture or character on the quickly rotating spoke by means of persistence of vision so as to achieve a highlighting and warning effect.

The present invention can be best understood through the following description and accompanying drawings wherein:

DETAILED DESCRIPTION OF THE PREFERRED EMBODIMENT

Figure 1:
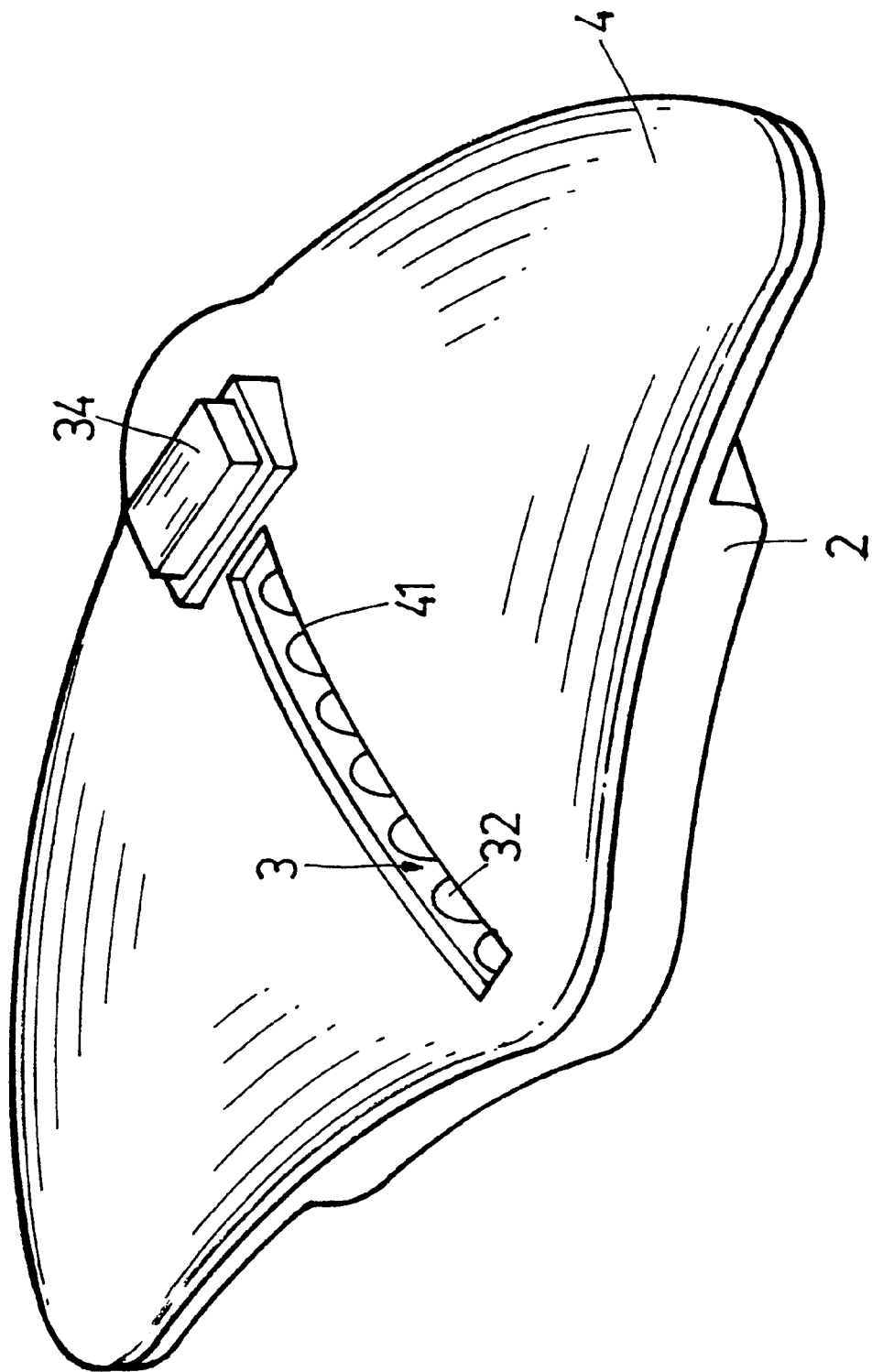
FIG. 1 is a perspective assembled view of the present invention.
Figure 2:
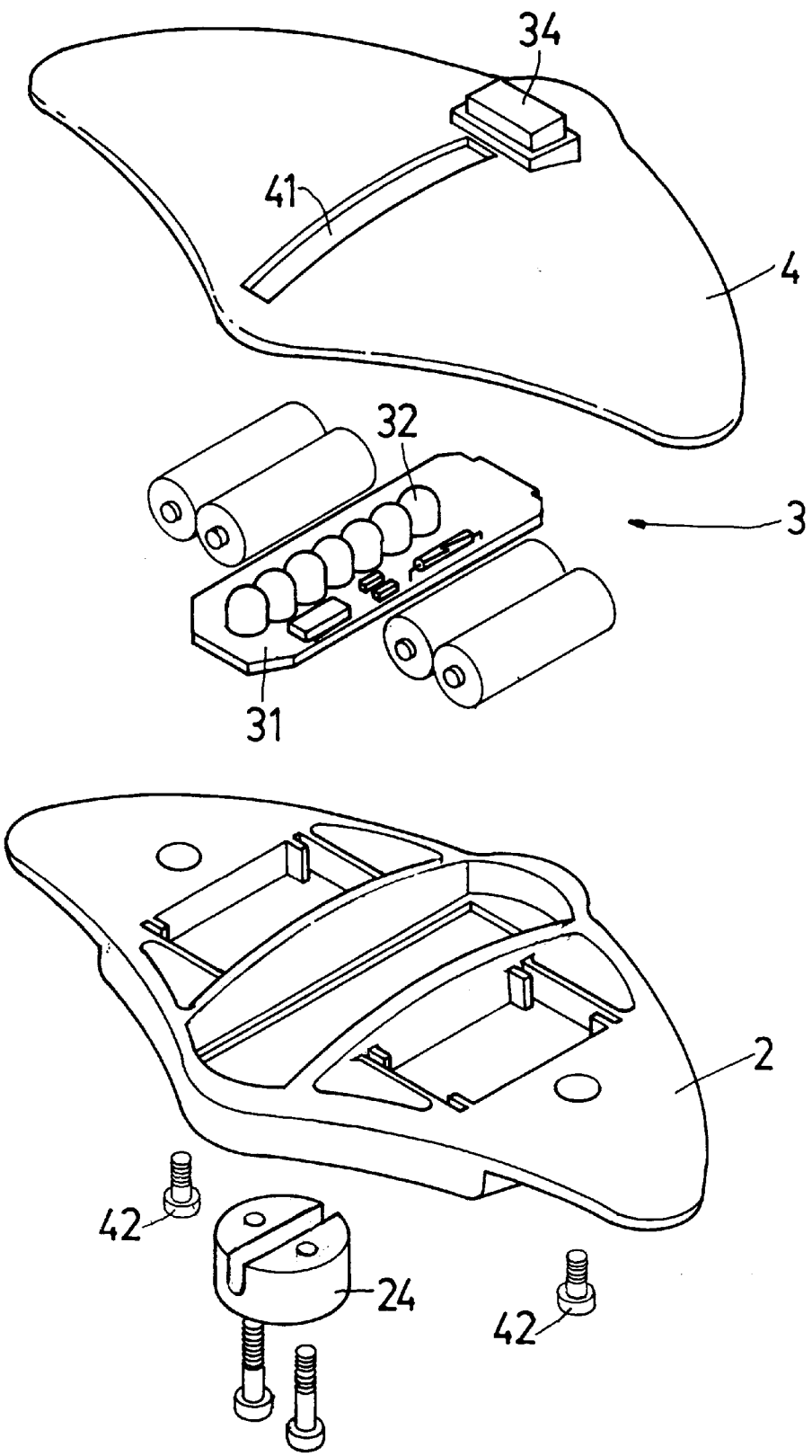
FIG. 2 is a perspective exploded view of the present invention.
Figure 3:
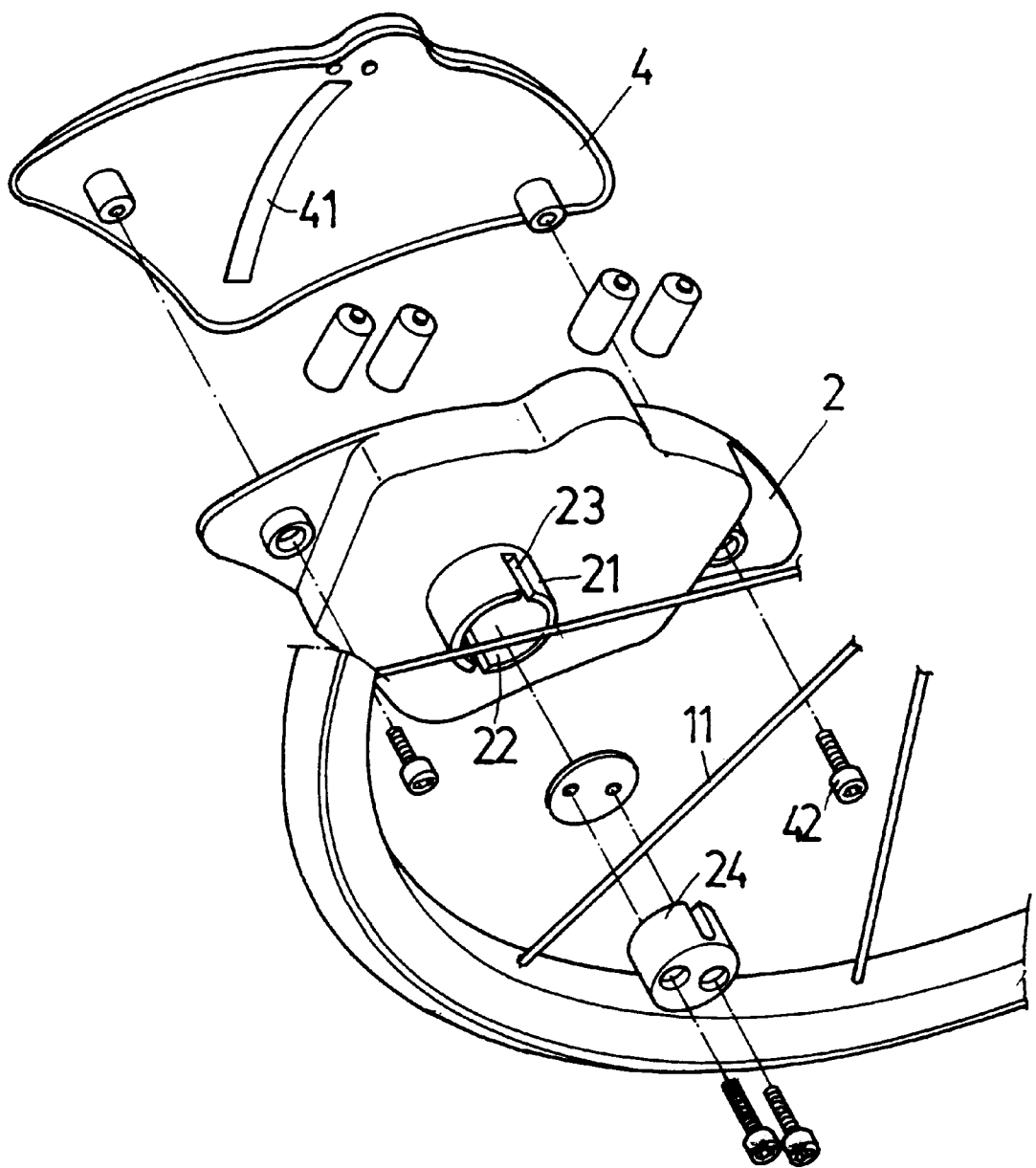
FIG. 3 is a perspective exploded view of the present invention seen from the other side.
Figure 4:
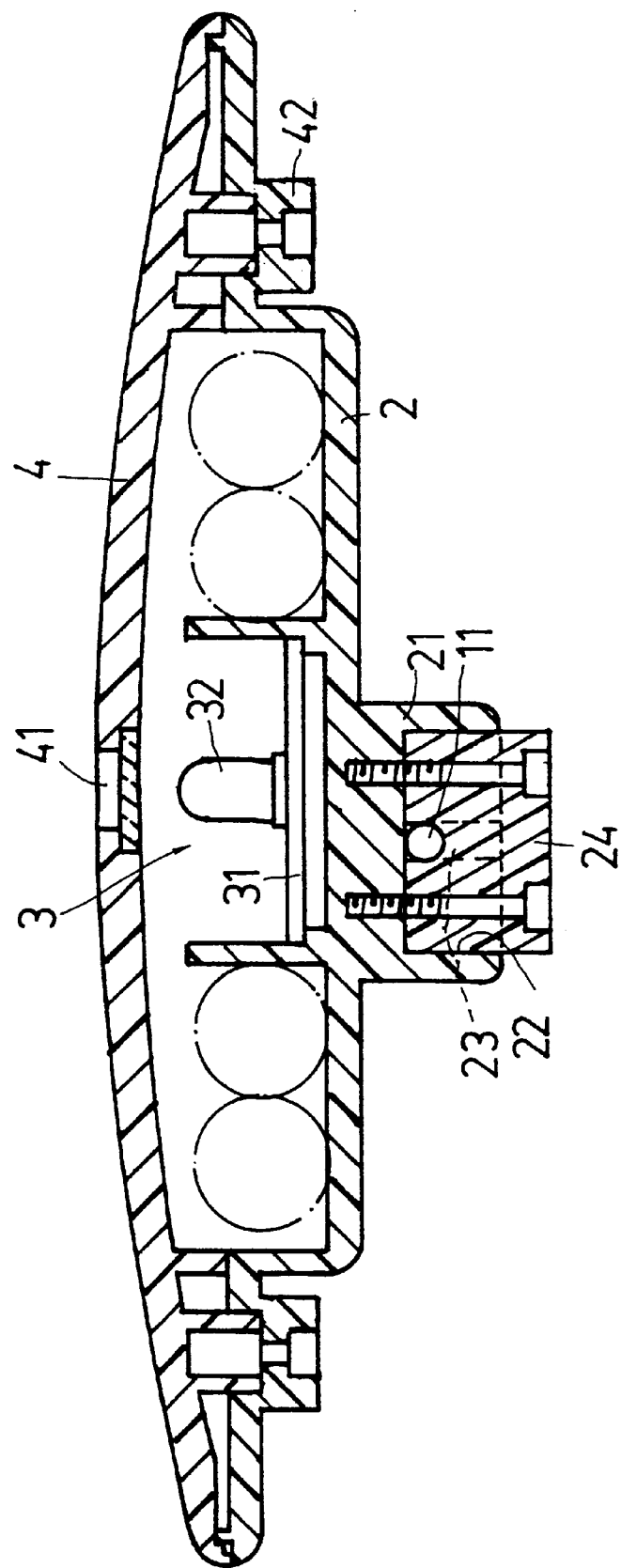
FIG. 4 is a sectional assembled view of the present invention mounted on the bicycle.

Please refer to FIGS. 1 to 7. The present invention includes:

a fixing board 2 mounted on the spoke 11 of the bicycle 1, a middle section of the fixing board 2 being formed with a skirt 21 defining a socket 22, the lateral wall of the socket 22 being formed with multiple insertion slits 23 for the spoke 11 of the bicycle 1 to insert thereinto, the socket 22 of the fixing board 2 being disposed with a stopper member 24 for clamping the spoke 11 and fixing the fixing board 2 on the spoke 11, a magnet 13 being disposed on the frame 12 of the bicycle 1;

a cover body 4 formed with a substantially rectangular light slot 41 at a middle section through which light passes, two sides of the cover body 4 being bolted on the fixing board 2 by two bolts 42; and a light emitting device 3 disposed on a base board 31 between the fixing board 2 and the cover body 4, including multiple light sources 32 and a controlling circuit 33. In this embodiment, the light sources 32 are light emitting diodes (briefly called LED).

Figure 5:
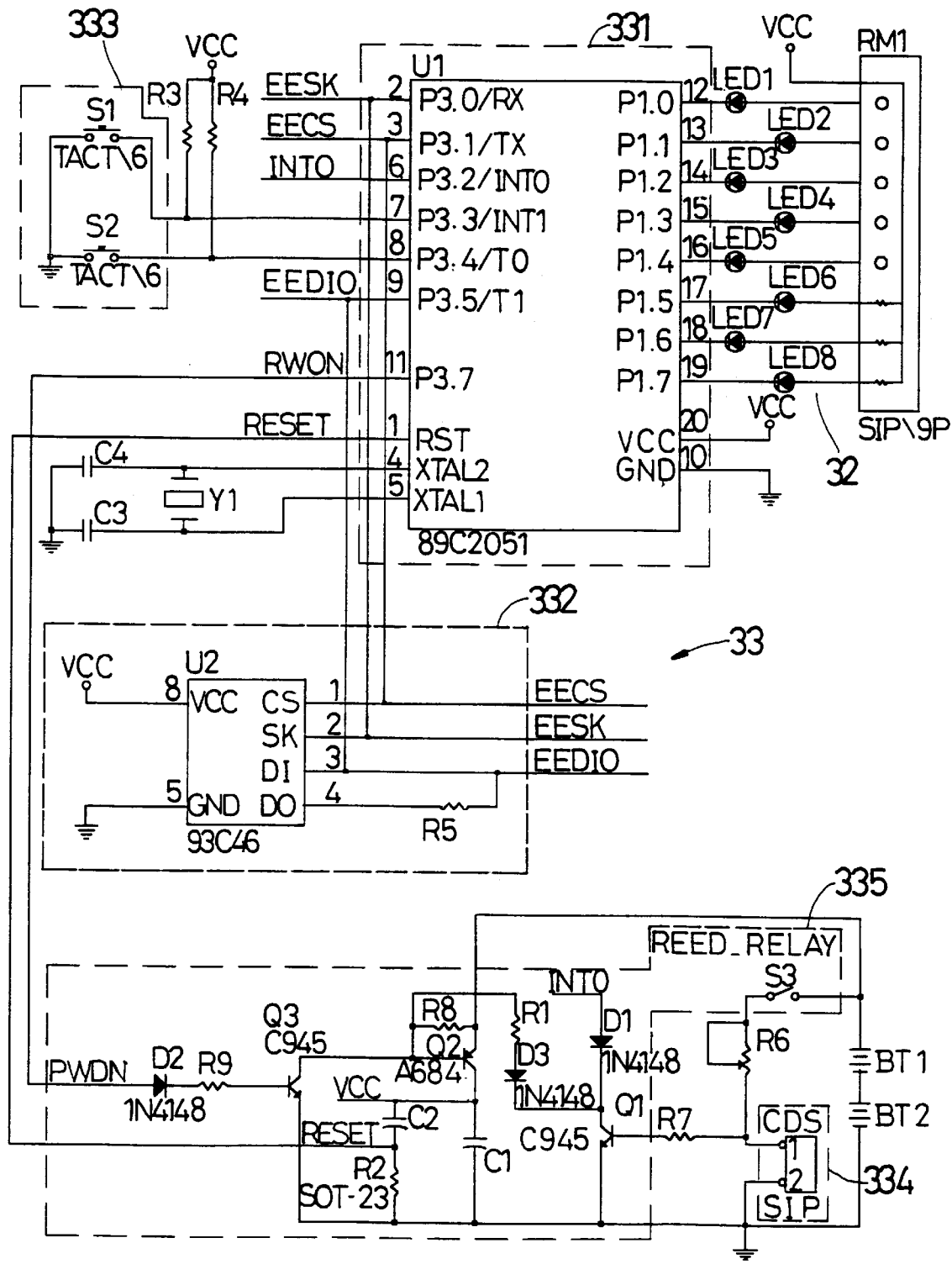
FIG. 5 is a circuit diagram of the controlling circuit of the present invention.

As shown in FIG. 5, the controlling circuit 33 includes a processor 331, a memory unit 332, a setting unit 333, a light sensing unit 334 and a rotational speed detecting unit 335. When the light sensing unit 334 senses that the ambient illumination is lower than a certain value, the rotational speed detecting unit 335 detects the magnet 13. When detecting magnetism, the circuit is closed. The rotational speed is judged by the interval of the closing of the circuit and repeatedly counted. When the rotational speed reaches a certain value, the processor 331 takes out the data set in the memory unit 332 by the setting unit 333, whereby the light source 32 disposed at the light slot 41 emits light according to the display time processed and transformed by the processor 331. Accordingly, the light sources 32 emit light to form a preset picture or character according to the rotational speed of the spoke by means of persistence of vision.

Figure 6:
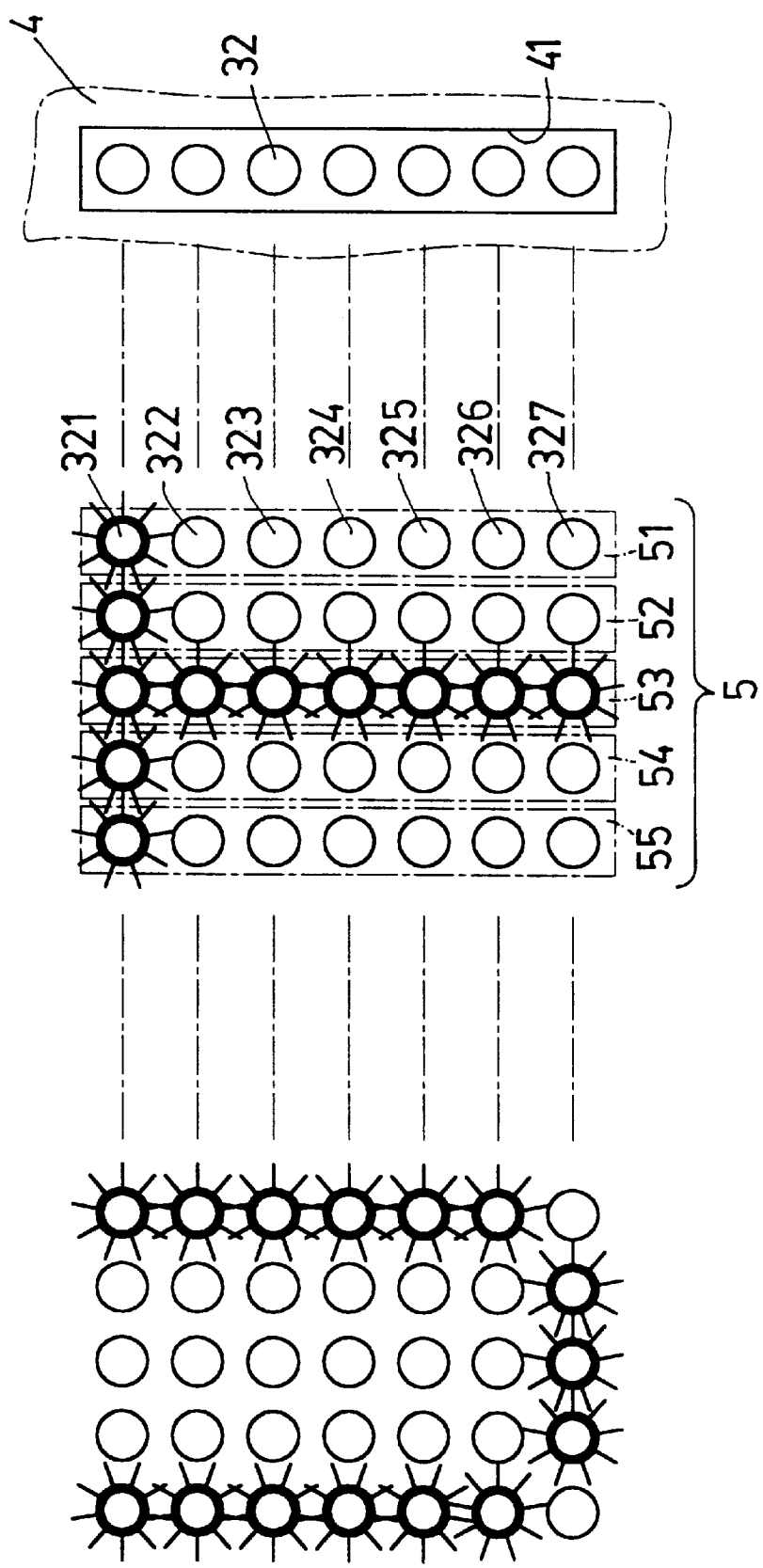
FIG. 6 shows that the light emitting device of the present invention emits light.
Figure 7:
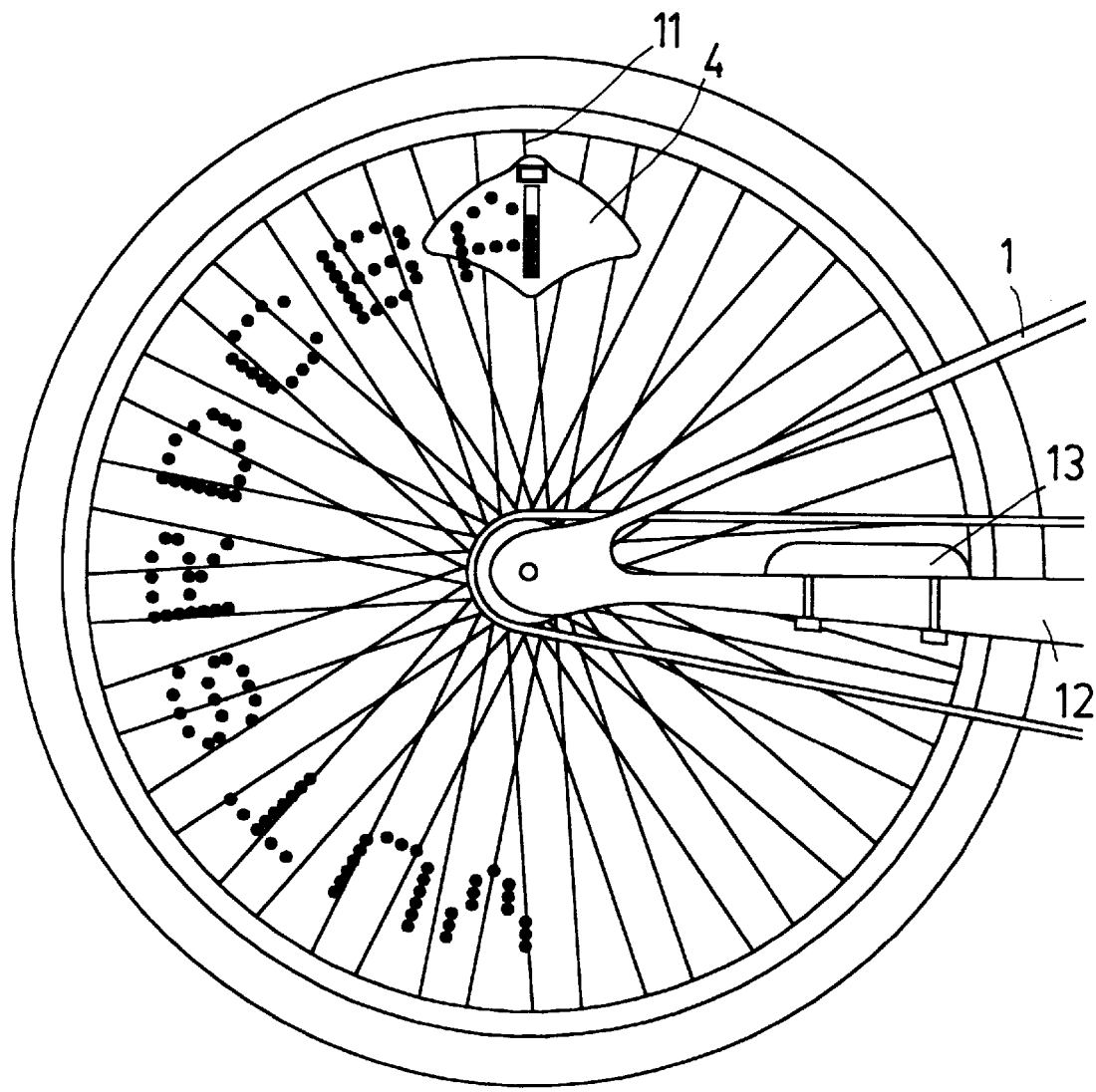
FIG. 7 shows the application of the present invention.

As shown in FIGS. 6 and 7, the light sources 32 can respectively show the preset characters on the spokes 11. The multiple light sources 32 are arranged into a 5×7 matrix for showing each character. By means of transforming whether the multiple light sources 32 emit light and the displaying time, the character or picture can be shown. When the spokes 11 start to rotate, the light emitting device 3 is rotated along therewith. At this time, the rotational speed detecting unit 335 detects the rotational speed and transforms the rotational speed into display position and display time, making the light sources 32 immediately emit light to form a picture of character and achieve a highlighting and warning effect.

Referring to FIGS. 6 and 7, for example, the preset character area is approximately one half of the circle. Therefore, if the time for rotating this half circle is less than $\frac{1}{32}$ second, the character(s) can bee seen in the half circle by the persistence of vision (that is, the vision temporally remaining in the brain). This half circle is divided into ten sections 5 for showing ten preset characters. Every character contains 5×7 points. So, each light emitting time of the light source 32 must less than $\frac{1}{1600}$ second. In this example, the light source 32 is composed of seven LEDs 321 to 327 (namely first LED to seventh LED) for emitting light. While using the character "T" as an example, when the light source 32 moves to the position 51 at a first light emitting time, only the first LED 321 is ON and the second to the seventh LED 322 to 327 are OFF. When the light source 32 moves to the position 52 at the next light emitting time, only the first LED 321 is ON. When the light source 32 move to the position 53, all the first to seventh LEDs 321 to 327 are ON. When the light source 32 moves to the position 54, only the first LED 321 is ON. Finally, when the light source 32 move to the position 55, only the first LED 321 is ON. Therefore, a complete character "T" can be seen. Thus, if all the characters in these ten sections 5 are completed within 1/32 second, these characters can be seen by the persistence of vision.

The above embodiment is only used to illustrate the present invention, not intended to limit the scope thereof. Many modifications of the above embodiment can be made without departing from the spirit of the present invention.

What is claimed is:

1. A bicycle spoke warning light device capable of setting and displaying characters, comprising:

a fixing board mounted on the spoke of the bicycle, a middle section of the fixing board being formed with a skirt defining a socket, a lateral wall of the socket being formed with multiple insertion slits for the spokes of the bicycle to insert thereinto, the socket of the fixing board being disposed with a stopper member for clamping the spokes;

a cover body formed with a light slot and fixed on the fixing board; and a light emitting device disposed between the fixing board and the cover body, including multiple light sources and a controlling circuit, the controlling circuit including a processor, a memory unit, a setting unit and a rotational speed detecting unit, data being set and stored in the memory unit by the setting unit, the rotational speed detecting unit detecting and judging the rotational speed of the spokes, whereby when the rotational speed reaches a certain value, the processor takes out the data set in the memory unit and makes the light sources emit light to form a picture or character by means of persistence of vision.

2. A bicycle spoke warning light device as claimed in claim 1, wherein the light source is a light emitting diode.

3. A bicycle spoke warning light device as claimed in claim 1, wherein the controlling circuit further includes a light sensing unit which senses ambient illumination, whereby when the ambient illumination is lower than a certain value, the rotational speed detecting unit starts to judge the rotational speed.

4. A bicycle spoke warning light device as claimed in claim 1, wherein a magnet is disposed on a frame of the bicycle, whereby the rotational speed detecting unit detects the magnetism of the magnet to close the circuit and judges the rotational speed of the spokes according to the interval of the closing of the circuit.

* * * * *